United States Patent
Kinder

(10) Patent No.: US 7,379,435 B1
(45) Date of Patent: May 27, 2008

(54) DETERMINING BROADCAST MESSAGE TRANSMIT TIMES FOR A WIRELESS DEVICE HAVING A PLURALITY OF WLAN MAC ADDRESSES

(75) Inventor: Richard D. Kinder, Eastwood (AU)

(73) Assignee: Cisco Technology, Inc., San Jose, CA (US)

( * ) Notice: Subject to any disclaimer, the term of this patent is extended or adjusted under 35 U.S.C. 154(b) by 463 days.

(21) Appl. No.: 11/116,543

(22) Filed: Apr. 28, 2005

(51) Int. Cl.
 *H04B 7/212* (2006.01)
(52) U.S. Cl. ............... 370/324; 370/338; 370/320
(58) Field of Classification Search ............ 370/324, 370/338, 320; 380/255
See application file for complete search history.

(56) References Cited

U.S. PATENT DOCUMENTS

2006/0251253 A1* 11/2006 Kappler et al. ............. 380/255

2007/0201420 A1* 8/2007 Tejaswini et al. ........... 370/338

* cited by examiner

*Primary Examiner*—Vincent P. Harper
*Assistant Examiner*—Phuoc Doan
(74) *Attorney, Agent, or Firm*—Dov Rosenfeld; Inventek

(57) ABSTRACT

A method, a software product, and an apparatus to determine time offsets to use with a local synchronization clock in a wireless device that can act as a plurality of (virtual) APs, each having a different network identifier. The offsets provide for the wireless device the time to transmit frames that include a broadcast-buffered indication for a particular (virtual) AP identified by a MAC address of a plurality of MAC addresses supported by the wireless device. The broadcast-buffered indication for a particular MAC address indicates that there is broadcast/multicast data buffered in the wireless device. The method is arranged such that the frames containing the broadcast buffered indication for each access point of the wireless device are transmitted by the wireless device at times spread substantially evenly, interleaved with other broadcast frames not containing broadcast buffered indications.

30 Claims, 4 Drawing Sheets

Define `delta_b = Period_beacon /Num_BSSID`..
If `Period_DTIM < Num_BSSID`, then `p_1=Num_BSSID`
Else, if `Period_DTIM = Num_BSSID`, then
        `p_1=Period_DTIM`,
    except, if `Period_DTIM >2`, then `p_1= Period_DTIM −1`, or
        if also `Period_DTIM >6`, then `p_1=Period_DTIM −2`, or
        if also `Period_DTIM >7`, then `p_1= Period_DTIM −3`.
Else, if `Period_DTIM > Num_BSSID`, then
        `p_1=Period_DTIM`.
Define `phase_multiplier= Period_DTIM/Num_BSSID`.
If `phase_multiplier = 0`, then
        `phase_multiplier = 1`.
For each BSSID `i`,
    If the DTIM period `Period_DTIM=Num_BSSID`, or if `Period_DTIM = Num_BSSID−1`, then
        `TSF_offset_i = (delta_b * i) +`
        `((Period_DTIM−i) * (Period_beacon*phase_multiplier))`.
    Else, if the `Period_DTIM = 1`, then
        `TSF_offset_i = i * delta_b`.
    Else, in all other case, i.e., if `Period_DTIM≠ Num_BSSID`, and if
    `Period_DTIM ≠ Num_BSSID−1`, and if `Period_DTIM ≠ 1`, then
        `TSF_offset_i = ((i mod p_1) * delta_b) +`
        `(i * phase_multiplier * Period_beacon)`.

FIG. 3

DETERMINING BROADCAST MESSAGE TRANSMIT TIMES FOR A WIRELESS DEVICE HAVING A PLURALITY OF WLAN MAC ADDRESSES

BACKGROUND

The present invention relates to wireless networks, and in particular to a method and apparatus to determine times for transmission of frames by a wireless device capable of supporting a plurality of MAC addresses such that the wireless device can function as a plurality of access points in a wireless network.

Wireless networks, in particular wireless local area networks (WLANs) such as those conforming to the IEEE 802.11 standard are becoming widely used. In a wireless network that acts in infrastructure mode, one wireless device acts as an access point (AP)—also called a base station—to a set of client stations, and all communication to and from a client station via the access point to which the client is associated.

Multiple BSSID Wireless Devices as Virtual Access Points

A new feature being developed for wireless devices is the ability for a single wireless device to act as multiple "virtual" access points, each for a different infrastructure wireless network. Thus, a single wireless device can act as an access point, also called a base station for a plurality of infrastructure networks. Each infrastructure network is identified by a network identifier. In the language of the IEEE 802.11 standard, each infrastructure network is called a basic service set (BSS), and the network identifier is a basic service set identifier (BSSID). For an AP, the BSSID is the MAC address of the AP. Thus, a single wireless device can have a plurality of MAC addresses.

An AP indicates its availability by broadcasting beacon frames. For a wireless device to act as more than a single AP, that is, to act as a multiple BSSID AP (MBSSID-AP) device, the wireless device needs to be able to broadcast multiple beacons spread across a beacon period, each beacon indicating that the broadcasting device has a different BSSID.

To a client station, an MBSSID-AP appears to be several distinct co-located APs.

Power Save Mode in WLANS

It is known for a wireless client of an infrastructure WLAN to work in power save mode, wherein the AP of the client notes which client is in "sleep" ("power save") mode, and buffers packets for clients in sleep mode. An indication by an AP to one or more particular clients that data is buffered for the client(s), called a traffic indication map element (TIM) in the case of the IEEE 802.11 standard, is used to make it possible for the AP to announce which client stations have data buffered. The TIM is sent with every beacon from the AP. Client stations that are in power save mode periodically wake up and listen for beacons. Thus, an AP broadcasts frames containing indications to particular client(s) that data is buffered for the client(s) in the AP.

A client receiving a TIM interprets the TIM to determine if unicast and multicast traffic is buffered on the AP for the client. A client station, once it determines that unicast data is buffered at the AP, transmits a short poll frame (a PS-Poll) to the AP, and the AP of the client station responds with the corresponding buffered unicast data, or acknowledges receipt of the poll and sends the buffered unicast data at a later time.

If the TIM indicating that data is buffered is sent during a contention-free period (CFP), a contention-free pollable client station operating in sleep mode does not send the short PS-Poll frame, but rather remains active until the buffered data is received, or until the CFP ends.

In addition to unicast traffic for a client station, there may be broadcast or multicast traffic buffered for client stations. On the AP side, if any client station is in sleep mode, the AP buffers all broadcast and multicast traffic. Once in a while, the AP broadcasts a frame—a beacon frame—that includes an indication that broadcast or multicast traffic is buffered in the AP. We call such an indication a broadcast-buffered indication. In the case of the IEEE 802.11 standard, the indication is called a delivery traffic indication map element (DTIM). Thus, an AP once in a while transmits a beacon containing a DTIM. The AP then delivers any multicast or broadcast traffic that is buffered to all clients immediately following transmission of the DTIM-containing beacon.

Recall a TIM identifies the client stations for which traffic is pending and buffered in the AP, and this is coded in a partial virtual bitmap. In addition, the TIM contains an indication of whether multicast/broadcast traffic is buffered. While an AP sends a TIM with every beacon, a DTIM rather than an ordinary TIM is transmitted within a beacon every period called a DTIM period. After transmitting a DTIM, an AP sends out any buffered broadcast or multicast traffic using normal frame transmission rules.

Thus, unicast traffic is obtained by the client via a PS-Poll, and multicast traffic destined to the clients in the BSSID is transmitted at the DTIM beacon boundary.

In an 802.11 WLAN, a timing synchronization function (TSF) keeps the timers for all stations in the same infrastructure network synchronized. The AP is the timing master and performs the TSF. Each station maintains a local TSF timer. Each client station's TSF timer keeps running even when stations are sleeping.

Power Save Mode for Virtual APs in a Device Supporting Multiple BSSIDs

With a single wireless device able to act as different APs for different sets of client stations, e.g., a single device having multiple BSSID's, problems arise if the individual beacon DTIM periods overlap between different infrastructure networks. As an example, consider the case of a single wireless device acting as the virtual AP of four BSSs. The wireless device thus has four corresponding BSSIDs, each with a DTIM period. Suppose the DTIM period was 2. The following describes what would be the default transmission order of the beacons:

Denote by B(n) a regular beacon frame for the device acting as AP with a BSSID denoted n, n=1, 2, 3, or 4, and denote by D(n) a beacon frame containing a DTIM for the wireless device acting as AP with the BSSID n, n=1, 2, 3, or 4. Then the sequence of transmitting beacons would be:

B(1) B(2) B(3) B(4) D(1) D(2) D(3) D(4)

This is undesirable because there is a cluster of DTIM beacons happening one after the other. Suppose, for example, that power save client stations are associated to all four "virtual" APs, i.e., with all four of the BSSIDs supported by the wireless device. After each DTIM beacon, all the multicast traffic that needs to be transmitted is so transmitted at the respective DTIM beacon boundary. If there is high priority traffic in another of the BSSIDs, such high priority traffic would be affected.

Thus there is a need in the art for a method for a wireless device to broadcast DTIM beacons for one BSSID in a manner such that traffic in other BSSIDs supported by the wireless device is unlikely to be affected in the case that the single wireless device acts as multiple APs, each with a different BSSID.

SUMMARY

One aspect of the invention provides for the intelligent spacing of DTIM beacons for a wireless device that supports multiple BSSIDs. One embodiment includes a method of determining the TSF offsets for given beacons to ensure that it is relatively unlikely that there are back-to-back DTIM beacons transmitted by the multiple BSSID wireless device.

Described herein is a method, a software product, e.g., in a carrier medium, and an apparatus to determine time offsets to use with a local synchronization clock in a wireless device that can act as a plurality of (virtual) APs, each having a different network identifier. The offsets provide for the wireless device the time to transmit frames that include a broadcast-buffered indication. In one embodiment, the wireless device includes a transceiver and modem for transmitting and receiving, and MAC hardware coupled to the transceiver and modem. The MAC hardware includes a local synchronization clock. Each network identifier identifies a wireless network for which the wireless device acts as an access point.

One embodiment of the method includes, for each network identifier of a plurality of network identifiers active in a wireless device that supports a plurality of network identifiers, determining a time offset to use with the local synchronization clock for the time for transmitting a frame that includes a broadcast-buffered indication indicating that there is broadcast or multicast traffic buffered in the particular access point of the network identifier in between other frames broadcast by the access point of the network identifier not containing broadcast buffered indications, the indications being to indicate to particular clients of the particular access point that data is buffered for that client in the access point. The determining uses the number of network identifiers active on the device, a provided time period that indicates the time between transmissions of frames that includes a broadcast-buffered indication, and a provided time period that indicates the time between transmissions of the other frames by the access point of the network identifier. The method is arranged such that the frames containing the broadcast buffered indication for each access point of the wireless device are transmitted by the wireless device at times spread substantially evenly, interleaved with other frames not containing broadcast buffered indications.

In one embodiment, the determining is configured such that it is relatively unlikely that two frames containing a broadcast-buffered indication are transmitted in succession by the wireless device to ensure that the wireless device has sufficient time to broadcast/multicast data buffered immediately after a broadcast-buffered indication-containing frame is transmitted.

In one embodiment, the provided time period that indicates the time between transmissions of frames that includes a broadcast-buffered indication is the same for all the BSSIDs supported by the wireless device, and the provided time period that indicates the time between transmissions of the other frames is the same for all the BSSIDs supported by the wireless device.

In a version described, the access points of the wireless device substantially conform to the IEEE 802.11 standard, the plurality of network identifiers is a plurality of BSSIDs, for a particular BSSID and the device acting as a particular virtual AP for the particular BSSID, the frame that includes a broadcast-buffered indication is a beacon frame that includes a DTIM, and the other frame broadcast by the particular virtual AP of the particular BSSID is a beacon frame that includes a TIM but not a DTIM. the provided time period that indicates the time between transmissions of frames that includes a broadcast-buffered indication is the DTIM period, and the provided time period that indicates the time between transmissions of the other frames is the beacon period for the virtual APs supported by the wireless device.

In one embodiment, the wireless device is coupled to network device such as a device that includes a switch—e.g., a switch—that includes a processor, and the determining of the time offset is by the processor of the switch, the method further comprising: accepting at the wireless device the determined time offsets for each BSSID supported by the wireless device, transmitting the frames containing the broadcast buffered indication according to the determined time offsets and the local synchronization clock, and transmitting the other frames.

In another embodiment, the determining of the time offset is at wireless device, the method further comprising: transmitting the frames containing the broadcast buffered indication according to the determined time offsets and the local synchronization clock, and transmitting the other frames.

Other aspects and features will be apparent from the description and the claims

BRIEF DESCRIPTION OF THE DRAWINGS

FIG. 3 shows pseudocode for a method embodiment that provides, for a fixed value DTIM count, that DTIM beacons are spread substantially evenly, interleaved with non-DTIM beacons, across the time period between successive DTIM beacons for any particular BSSID.

DETAILED DESCRIPTION

Described herein is a method, and software, e.g., code stored in a carrier medium that provides for spacing of DTIM beacons in a wireless device that supports multiple BSSIDs, i.e., that can act as a plurality of APs.

Figure 1:
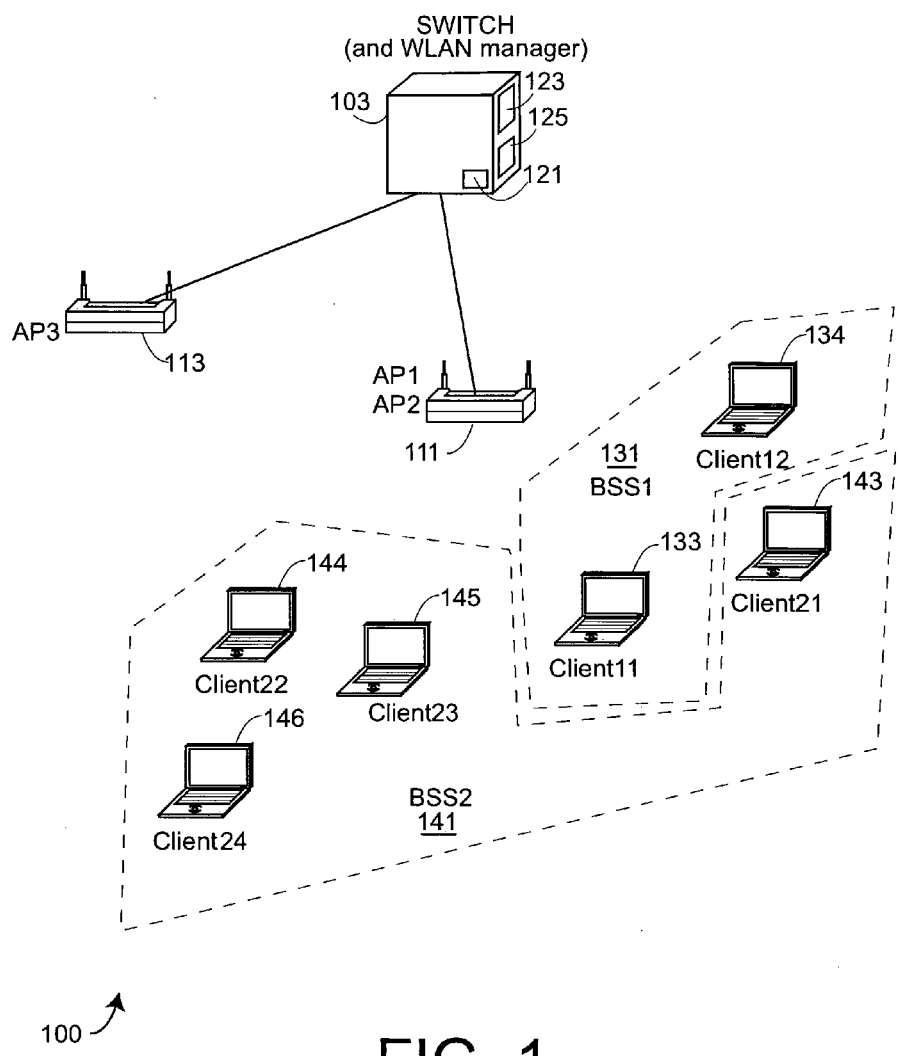
FIG. 1 shows part of an exemplary wireless network 100 that includes a wireless device that has at least two MAC addresses, that acts as two access points, and that includes an embodiment of the present invention.

FIG. 1 shows part of an exemplary network 100. A set of wireless devices acting as APs—two devices, 111 and 113—are shown coupled to a network device 103. The network device, for example may include a switch. Device 111 has two basic service sets, respectively denoted BSS1 and BSS2 that have a BSSID denoted BSSID1 and BSSID2, respectfully. Wireless device 111 thus acts as two APs, denoted AP1, and AP2. In this description, the wireless device 111 includes an embodiment of the present invention.

The network device 103 may also perform other functions, e.g., network device 103 may act as a switch 103 and may also act as a WLAN manager managing such aspects as security and the setting of radio parameters. For the remainder of the description, the device 103 is assumed to be a switch. The coupling of the wireless devices 111 and 113 to the switch 103 may be direct, or via a network. In one embodiment, the coupling is via a fast network such as a Gigabit Ethernet.

BSS1, shown with reference numeral 131, is managed by AP1 of wireless device 111 with BSSID1, and includes client stations 133 and 134, respectively denoted Client11 and Client12. BSS2, shown with reference numeral 141, is managed by AP2 of wireless device 111 with BSSID2, and includes client stations 143, 144, 145, and 146, respectively denoted Client21, Client22, Client23, and Client24. While the drawing shows that the device 111 supports two BSSIDs, in general, a multiple-BSSID wireless device supports a larger number of BSSIDs.

The switch includes a switch processor 123 coupled to a switch memory 125. Part of the switch memory 125 includes code that causes the processor, in combination with hardware and/or software in wireless device 111, to implement aspects of the present invention.

Figure 2:
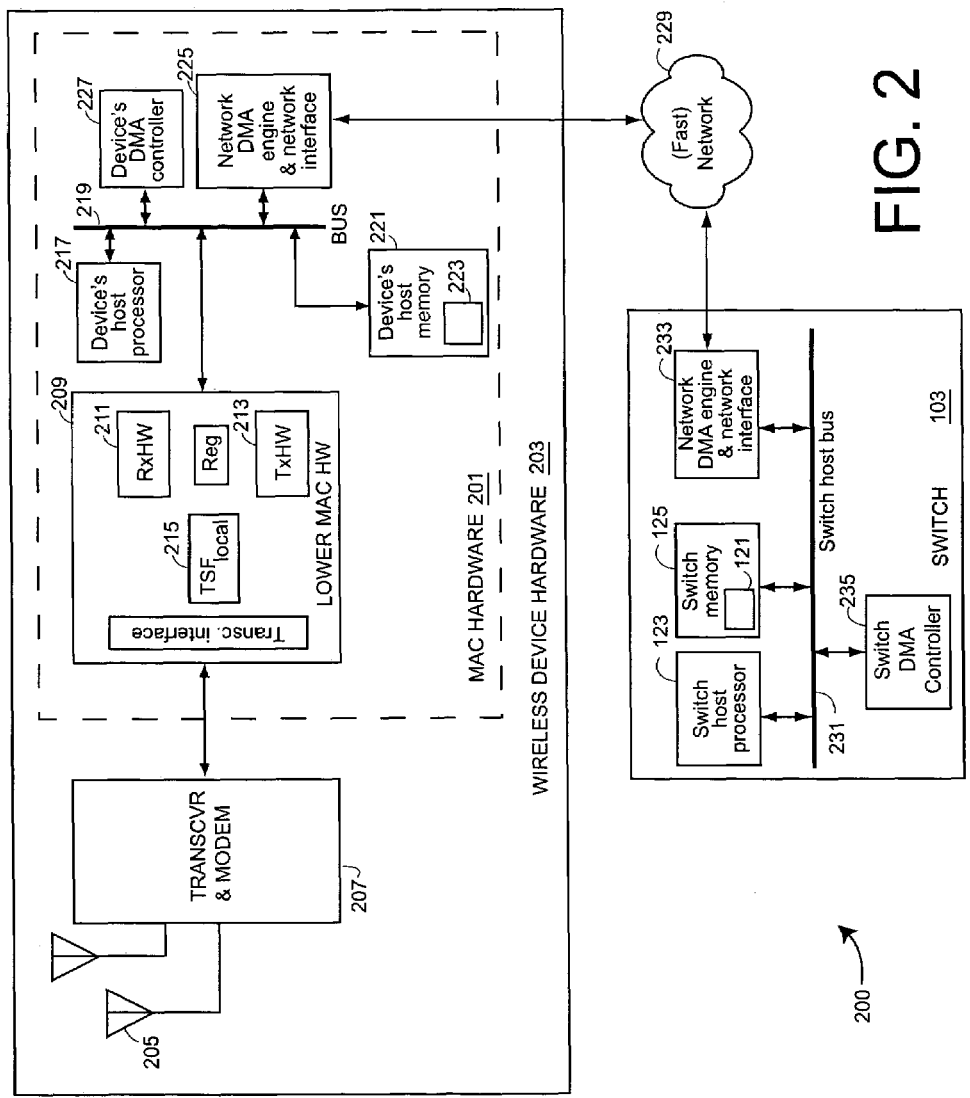
FIG. 2 shows a simplified block diagram of one embodiment of the hardware of a wireless device that including aspects of the present invention for managing a plurality of BSSIDs.

FIG. 2 shows a simplified block diagram of one embodiment 200 of the hardware that operates wireless device 111, including aspects of the present invention for managing a plurality of BSSIDs. The hardware at the wireless device is shown as wireless device hardware 203, and is coupled to the switch 103. In one embodiment, part of the operation of the MAC is carried out at the switch 103, and other, lower function parts are carried out in the wireless device hardware 203. The coupling between the access point hardware 203 and switch 103 is via a fast, e.g., Gigabit Ethernet network 229.

The wireless device hardware 203 in one embodiment includes one or more antennas 205 for transmitting and receiving, coupled to a transceiver and modem 207 that receives MAC frames of information, and that transmits MAC frames. The transceiver and modem 207 is coupled to a MAC processor. In the embodiment shown, the functionality of the MAC processor is split between lower MAC hardware 209, a processing system on the wireless device hardware 203, and the switch 103. The transceiver and modem 207 is coupled to the lower MAC hardware 209 via a transceiver interface in the lower MAC hardware. The lower MAC hardware 209 includes receive MAC hardware 211, transmit MAC hardware 213, a local TSF clock 215 denoted $TSF_{local}$, and a register set for passing data. The wireless device hardware 203 is coupled to a wireless device processing system that includes a wireless device host processor 217 coupled via a bus subsystem 219 to a memory 221—the wireless device host memory. A DMA controller 227 deals with DMA transfers.

Those parts of the MAC processing that are based in the wireless device, including aspects of the present invention, are controlled by code 223 that is loaded into the wireless device's host memory 221.

For purposes of this description, the combination of the lower MAC hardware 209 and the wireless device processing system that include, e.g., the wireless device host processor 217 coupled via the bus subsystem 219 to the memory 221, is called the MAC hardware 201 herein, and is shown within a dashed line box in FIG. 2, recognizing of course that the wireless device processing system is used for other aspects of operating the wireless device, e.g., operating the device as a wireless station, and not having to do specifically with MAC processing.

In addition, aspects of the MAC processing, including aspects of the present invention, are carried out at the switch 103.

In one embodiment, the switch 103 includes a switch processing system that has a switch host processor 123, and switch memory 125 coupled to the host processor 123 via a bus subsystem 231. The switch 103 further includes a DMA controller 235 to set up DMA transfers to and from the switch memory 125. Some aspects of the present invention are in the form of code to instruct the processor 123 to carry out one or more steps of a method embodiment of the invention. Thus, aspects of the invention are in the form of code 121 carried in a carrier medium, e.g., memory 125. Furthermore, aspects of the invention may be in the form of a carrier medium that is split between the wireless device hardware 203 and the switch 103, e.g., as a combination of code 223 and code 121.

In the embodiment shown here, when the wireless device transmits, data is streamed from the switch memory 125 directly to the transmit hardware 213 during transmission via a fast network link as if there was no network present. Such streaming is controlled at the wireless device by a network DMA engine and network interface 225 that uses special frames to set up the streaming from the switch memory 125. At the switch, a switch network DMA engine and network controller 233 understands the special frames and uses the information therein to set up the DMA via the switch DMA controller 235. The DMA transfer itself also uses special frames that are formed at the switch's network DMA engine and network controller 233, and understood at the wireless device's network DMA engine and network controller 225.

Furthermore, during receive, in the embodiment shown herein, data is streamed directly into the switch memory 125 via the network 229 as if there was a direct, non-network connection. Such streaming is carried out also using the wireless devices' network DMA engine and network interface 225, and the switch's DMA engine and network interface 233, again using special frames for both setting up the DMA streaming and for streaming of the data itself.

The streaming aspects are described in co-pending U.S. Pending patent applications Ser. No. 10/724,559 filed Nov. 26, 2003 to Krischer, et al., titled "A METHOD AND APPARATUS TO PROVIDE DATA STREAMING OVER A NETWORK CONNECTION IN A WIRELESS MAC PROCESSOR", and No. 10/815,283 filed Mar. 31, 2004 to Krischer, et al., titled "METHOD AND APPARATUS TO PROVIDE INLINE ENCRYPTION AND DECRYPTION FOR A WIRELESS STATION VIA DATA STREAMING OVER A FAST NETWORK," both assigned to the assignee of the present invention. The contents of both Applications Nos. 10/724,559 and 10/815,283 are incorporated herein by references for all purposes.

It should be noted that the present invention does not depend on any particular architecture of the wireless device used as the wireless device supporting multiple BSSIDs, or of the MAC processing therein. For example, the network link with the network DMA processors 225 at the wireless device and 233 at the switch can be replaced by non-network connections. Furthermore, in a more traditional architecture, the DMA transfers during transmit and receive can be from and to the wireless device host memory 221. Those in the art will recognize other architectures are possible.

Before further describing aspects of the invention, a review of the TSF in a wireless device is appropriate. In an 802.11 system, an AP in a BSS may transmit a frame that contains time synchronization information, such as a beacon that includes a timestamp. The timestamp represents the time that the first bit of the timestamp is transmitted onto the medium (IEEE 802.11b) or of the start of the OFDM symbol that contains the first bit of the timestamp (IEEE 802.11a or 802.11g). This time needs to be related, i.e., synchronized to the actual time of the network using the local TSF clock that is synchronized to the network TSF, for example using some previously received time synchronization information. Thus, a client station in a BSS adjusts its local TSF, e.g., $TSF_{local}$ 215 in FIG. 2 so that it would have contained the same value as its AP at the correct network time.

TSF is typically performed by real-time processing in software, using comparison and modification of the running hardware TSF clock, e.g., $TSF_{local}$ 215. Such an approach can cause problems. Firstly, the hardware clock may arbitrarily jump in time. Secondly, the requirement for real time processing in software is onerous. Therefore, in the embodiment assumed herein, an approach is assumed such as described in U.S. patent application Ser. No. 10/112,220 filed Mar. 29, 2002 to Myles et al., titled "METHOD AND APPARATUS FOR CLOCK SYNCHRONIZATION IN A WIRELESS NETWORK," published as US 20040008661 on Jan. 15, 2004, and assigned to the assignee of the present invention. The contents of U.S. patent application Ser. No. 10/112,220 (US 20040008661) are incorporated herein by reference for all purposes.

One method implementation described in US 20040008661 includes receiving a frame containing synchronization information, extracting the synchronization information from the received first frame, copying a local free-running clock at a known reference point in time relative to the time the first data unit was received to generate a local timestamp, and calculating an offset to the free-running clock using the extracted synchronization information and the local timestamp. The calculating can be in non real-time, such that the sum of the calculated offset and the value of the free-running clock provides a local clock value that is approximately synchronized in time. An apparatus implementing the method is part of a node of a wireless network, and provides a time synchronization function, typically at the MAC layer. The method can be readily implemented in a combination of hardware and software.

Thus, an aspect of US 20040008661 provides synchronized time without requiring real-time processing such as real-time comparison and modification of a running timer.

One node embodiment of US 20040008661 uses a free-running clock and calculates an offset in non real-time from received frames such as beacons that include synchronization information, e.g., beacons. The synchronized TSF time is the sum of the free-running clock value and the offset.

One method embodiment of US 20040008661 applicable to a wireless device that includes a local free-running clock such as $TSF_{local}$ 215 of FIG. 2 includes the wireless device receiving a frame that contains synchronization information, a beacon, and generating a local timestamp by taking a copy (in hardware) of the local free-running clock $TSF_{local}$ at a known receive reference point during reception of the packet. The method embodiment further includes the wireless device extracting the received timestamp from the timestamp field of the received beacon packet. The method further includes calculating an offset based on the received timestamp and the local timestamp. In the case that the wireless device is a station in a BSS, the offset is recalculated every time a beacon is received. The method further includes the wireless device using the sum of the local free-running clock $TSF_{local}$ and the most recently calculated offset, denoted $TSF_{offset}$ as the synchronized time.

In the case that the wireless device is a station in a BSS, a method embodiment in US 20040008661 further includes recalculating the offset by using the received timestamp, subtracting the local timestamp $TSF_{local}$, and also subtracting the difference between the points in the beacon referenced by the local timestamp and the received timestamp. The difference may be a function of the data rate.

One method embodiment includes, for the case of transmitting, a client station or an AP inserting the sum of the free-running clock and an adjustment factor into transmitted beacons.

One method embodiment for a wireless device acting as an AP in a BSS transmitting a beacon includes sending the beacon and an adjustment factor for transmission to transmit hardware included in the transmitting wireless device. The adjustment factor is calculated using the last calculated offset $TSF_{offset}$ and adding the time difference between the time the hardware calculates the transmit timestamp, e.g., just before transmission and the time referenced by the transmit timestamp. The time difference may be a function of the data rate. The method further includes the transmitting wireless device calculating a transmit timestamp by using the local free-running clock $TSF_{local}$ and adding the adjustment factor. In one embodiment, this transmit timestamp calculating is carried out in hardware just before transmission. The method further includes the transmitting wireless device inserting the transmit timestamp into the beacon timestamp field. In one embodiment, this inserting is also carried out in hardware just before transmission.

With this background on how timestamps are included in beacons, one embodiment of the present invention is a method to set the TSF offset for a given beacon to ensure that it is relatively unlikely that there are back-to-back DTIM beacons of different BSSIDs transmitted by the wireless device 111 that has multiple BSSIDs.

Another aspect of the invention is a method to calculate a desirable value for the TSF offset for each of the BSSIDs in an MBSSID enabled wireless device, when the DTIM for each BSSID is constant. The desirable value of the TSF offset is preferably an optimal value for the TSF offset.

In general, a method embodiment provides, for a fixed value DTIM count, that the DTIM beacons are spread substantially evenly, interleaved with non-DTIM beacons, across the time period between successive DTIM beacons of any one of the plurality of BSSIDs supported by the wireless device. The method includes calculating for each BSSID a TSF offset using system parameters such as the DTIM count, the beacon period, the inter-beacon spacing, and values derived from these system parameters. The method is a piecemeal function, which calculates the TSF offset for a given BSSID number based on the input parameters. Different equations are used to calculate the TSF offset based on the relationship between the DTIM period and the number of BSSIDs in the system.

One method embodiment 300 is shown in pseudocode in FIG. 3. Referring to FIG. 3, denote the beacon period by Period_beacon. That is, for any BSSID, a beacon is sent every Period_beacon. Denote by Num_BSSID the number of BSSIDs enabled (configured) on the wireless device. Denote the DTIM period by Period_DTIM. That is, for any BSSID, a DTIM beacon is sent every Period_DTIM. Define as the delta beacon time, denoted by delta_b the time between beacons of any of the BSSIDs on the wireless device. Thus, delta_b is the beacon period divided by the number of BSSIDs, Num_BSSID. That is, delta_b=Period_beacon/Num_BSSID.

The initialization is as follows:

If Period_DTIM <Num_BSSID, then p_1=Num_BSSID

Else, if Period_DTIM =Num_BSSID, then p_1=Period_DTIM, except, if Period_DTIM>2, p_1=Period_DTIM−1, or if Period_DTIM>6, p_1=Period_DTIM−2, or if Period_DTIM>7, p_1=Period_DTIM−3.

Else, if Period_DTIM >Num_BSSID, then p_1=Period_DTIM

Define phase_multiplier as the DTIM period (an integer) divided by the BSSID count Num_ESSID. That is, phase_multiplier =Period_DTIM/Num_BSSID.

If phase_multiplier =0, then let phase_multiplier =1.

That is, phase_multiplier=max(1, integer(Period_DTIM/Num_BSSID)).

Denote the present BSSID by i.

For each BSSID i configured in the system,

If the DTIM period Period_DTIM=Num_BSSID, or if Period_DTIM=Num_BSSI−1, then set the TSF offset for BSSID i, denoted TSF_offset_i as TSF_offset_i =(delta_b * i)+((Period_DTIM−i)* (Period_beacon*phase_multiplier)).

Else, if the Period_DTIM=1, then

TSF_offset_i =i * delta_b.

Else, in all other case, i.e., if Period_DTIM ≠Num_BSSID, and if Period_DTIM ≠Num_BSSID−1 and if Period_DTIM ≠1, then set the TSF offset for BSSID i as TSF_offset_i = ((i mod p_1)*delta_b)+(i * phase_multiplier*Period_beacon).

The inventors have found that the method sufficiently ensures that for the case that all BSSIDs for the device have the same DTIM period, DTIM beacons are spread out evenly across the time between successive DTIM beacons for any one of the BSSIDs. The inventors have found also that the method sufficiently ensures that two DTIM beacons are not transmitted in succession, i.e., back to back. This in turn ensures that there is time to broadcast/multicast the data buffered immediately after a DTIM beacon is transmitted.

Figure 4:
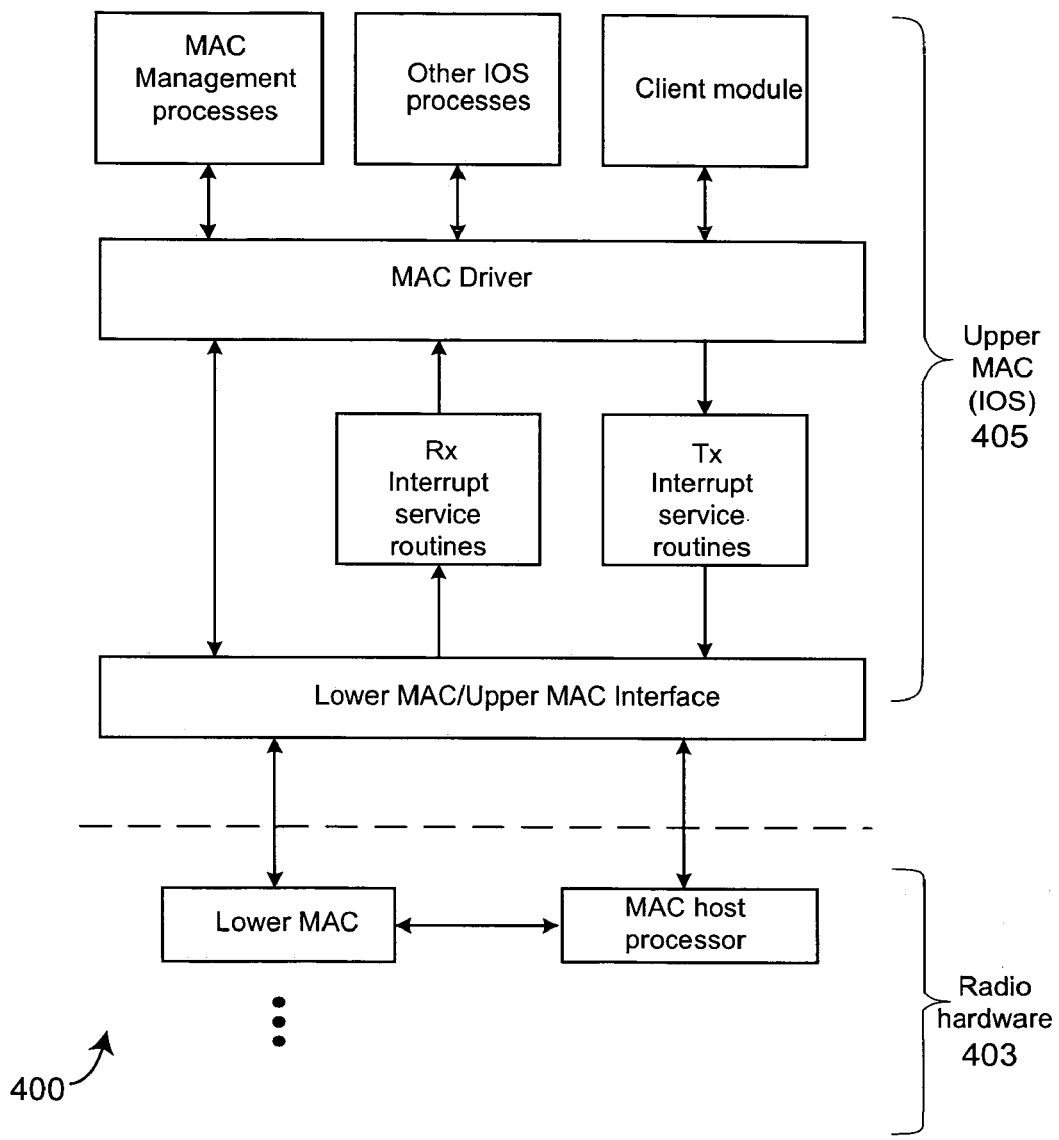
FIG. 4 shows in simplified block diagram form one embodiment of a software architecture for the wireless device shown in FIG. 2 that includes an implementation of one or more aspects of the present invention.

FIG. 4 shows one embodiment 400 of a software architecture for the wireless device shown in FIG. 2. The tasks are split between the switch 103, with software 405 operating on the switch host processor 123, e.g., under IOS, the operating systems used in switches made by Cisco Systems, Inc., San Jose, Calif., related to the assignee of the present invention, and software 403 operating in the wireless device hardware 203, in particular, the wireless device hardware's host processor 217 and the lower MAC hardware 209. MAC functions occur as interrupt routines that operate under IOS.

In one embodiment the layering of the method of FIG. 4 includes the following tasks carried out under IOS in the switch:

Configuring of the DTIM period for each of the BSSIDs supported.

Configuring the beacon period for each of the BSSIDs supported.

Calculating the inter-beacon period delta_b.

Implementing the method of FIG. 3 based on the configured parameters.

Packaging for transmission to the radio of DTIM data such as the TSF offset and DTIM period for each BSSID.

Passing the packaged DTIM data inline to the wireless device hardware 203 with the data for the beacon frame to be transmitted in the DTIM beacon for each such BSSID.

The tasks carried out the wireless device hardware 203 include:

Ascertaining for the particular BSSID based on the TSF offset and the current TSF time $TSF_{local}$, whether a beacon is a DTIM beacon or normal beacon, and transmitting the beacon for the particular BSSID as either a DTIM or a normal beacon.

One embodiment of the wireless device shown in FIG. 2 provides for up to 16 BSSIDs, i.e., different simultaneous MAC addresses on the wireless device when the wireless device acts as one or more APs. Another allows for up to 64 BSSIDs on the wireless device when the wireless device acts as one or more APs.

Some particulars on one embodiment include the following features:

All BSSIDs are synchronized to the same clock shown as $TSF_{local}$.

All BSSIDs have the same transmit power.

All BSSIDs use the same set of transmit data rates.

MAC address allocation is dynamically assigned by the radio sequentially, commencing with the lowest significant nibble as 0x0 through 0xf.

Beacons occur in a burst at target beacon times as a result of all the BSSIDs sharing a single TSF.

Beacon DTIMs occur in a burst followed by delivery of all BSSID multicasts.

Note that while in the embodiment described, BSSIDs are assigned sequentially by the wireless device; active BSSIDs do not have to be in sequential order.

Thus has been described a method and a carrier medium, and an apparatus to allocate message offset times in a wireless access point having a plurality of MAC addresses (BSSIDs).

It should be appreciated that although the invention has been described in the context of the IEEE 802.11 standard, the invention is not limited to such contexts and may be utilized in various other applications and systems, including, for example other WLAN standards and other wireless standards. Applications that can be accommodated include IEEE 802.11 wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, TDMA packet radios, and so forth.

The methodologies described herein are, in one embodiment, performable by a machine, which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD)

or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of a wireless device that can act as a plurality of "virtual" APs, i.e., a wireless device that can support multiple MAC addresses, e.g., as multiple BSSIDs of infrastructure networks. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to: non-volatile media or volatile media. Non-volatile media includes, for example, optical, magnetic disks, and magneto-optical disks. Volatile media includes dynamic memory, such as main memory. For example, the term "carrier medium" shall accordingly be taken to include, but not be limited to, a solid-state memory memories an optical medium, or a magnetic medium media, and carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

"Variants of the IEEE 802.11 standard" as used herein means the variants and proposed variants of the IEEE 802.11 standard. Variants are versions defined in clauses of the standard and proposed amendments of the standard.

While one embodiment of the receiver (FIG. 2) operates by splitting MAC tasks between a switch and a wireless device, other embodiments are possible, e.g., in which more of the tasks occur at the wireless device.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A method comprising:
    for each network identifier of a plurality of network identifiers active in a wireless device that supports a plurality of network identifiers, the wireless device including a transceiver and modem for transmitting and receiving, and MAC hardware coupled to the transceiver and modem, the MAC hardware including a local synchronization clock, each network identifier identifying a wireless network for which the wireless device acts as an access point:
    determining a time offset to use with the local synchronization clock for the time for transmitting a frame that includes a broadcast-buffered indication indicating that there is broadcast or multicast traffic buffered in the particular access point of the network identifier in between other frames broadcast by the access point of the network identifier not containing broadcast-buffered indications, the broadcast-buffered indications being to indicate to particular clients of the particular access point that data is buffered for that client in the access point, the determining using the number of network identifiers active on the device, a provided time period that indicates the time between transmissions of frames that includes a broadcast-buffered indication, and a provided time period that indicates the time between transmissions of the other frames by the access point of the network identifier,
    such that the frames containing the broadcast buffered indication for each access point of the wireless device are transmitted by the wireless device at times spread substantially evenly, interleaved with other frames not containing broadcast buffered indications.

2. A method as recited in claim 1, wherein the determining is configured such that it is relatively unlikely that two frames containing a broadcast-buffered indication are transmitted in succession by the wireless device to ensure that the wireless device has sufficient time to broadcast/multicast data buffered immediately after a broadcast-buffered indication-containing frame is transmitted.

3. A method as recited in claim 1, wherein the provided time period that indicates the time between transmissions of frames that includes a broadcast-buffered indication is the same for all the BSSIDs supported by the wireless device, and wherein the provided time period that indicates the time between transmissions of the other frames is the same for all the BSSIDs supported by the wireless device.

4. A method as recited in claim 1, wherein the access points of the wireless device substantially conform to the IEEE 802.11 standard, wherein the plurality of network identifiers is a plurality of BSSIDs, wherein for a particular BSSID and the device acting as a particular virtual AP for the particular BSSID, the frame that includes a broadcast-buffered indication is a beacon frame that includes a DTIM, and the other frame broadcast by the particular virtual AP of the particular BSSID is a beacon frame that includes a TIM but not a DTIM, wherein the provided time period that indicates the time between transmissions of frames that includes a broadcast-buffered indication is the DTIM period, and wherein the provided time period that indicates the time between transmissions of the other frames is the beacon period for the virtual APs supported by the wireless device.

5. A method as recited in claim 1, wherein the wireless device is coupled to a network device that includes a processor, and wherein the determining of the time offset is by the processor of the network device, the method further comprising:
    accepting at the wireless device the determined time offsets for each BSSID supported by the wireless device,
    transmitting the frames containing the broadcast buffered indication according to the determined time offsets and the local synchronization clock, and
    transmitting the other frames.

6. A method as recited in claim 5, wherein the network device includes a switch.

7. A method as recited in claim 1, wherein the determining of the time offset is at wireless device, the method further comprising:
    transmitting the frames containing the broadcast buffered indication according to the determined time offsets and the local synchronization clock, and
    transmitting the other frames.

8. A method as recited in claim 4, wherein the DTIM period is the same for all the BSSIDs supported by the wireless device, wherein the beacon period is the same for all the BSSIDs supported by the wireless device, and wherein for a number Num_BSSID of BSSIDs enabled on the wireless device, the determining includes:
(a) if the DTIM period is less than Num_BSSID, setting a number p1 as Num_BSSID,
    else if the DTIM period equals Num_BSSID, setting p1 as the DTIM period, except,
        if the DTIM period>2, setting p_1 as the DTIM period−1, or
        if the DTIM period>6, setting p_1=the DTIM period−2, or
        if the DTIM period>7, p_1=the DTIM period−3,
    else, if the DTIM period is greater than Num_BSSID setting p_1 as the DTIM period;
(b) setting a value phase_multiplier as the DTIM period divided by the Num_BSSID unless DTIM period is less than Num_BSSID, in which case setting phase_multiplier to 1, and
(c) for each BSSID i enabled in the wireless device,
    if the DTIM period is the same as Num_BSSID, or if the DTIM period is Num_BSSID−1, denoting the interbeacon period equal to the beacon period devided by Num_BSSID as delta_b, setting the TSF offset for BSSID i as (delta_b * i)+((the DTIM period−i)*(the beacon period*phase_multiplier)), else, if the DTIM period is 1, setting the TSF offset for BSSID i as i * delta_b,
    else, in all other cases, setting the TSF offset for BSSID i as ((i mod p_1) * delta_b)+(i * phase_multiplier * the beacon period)

with * denoting multiplication.

9. A computer-readable medium on which are encoded one or more computer readable code segments that when executed by a processing system cause carrying out a method, the method comprising:
    for each network identifier of a plurality of network identifiers active in a wireless device that supports the plurality of network identifiers, the wireless device including a transceiver and modem for transmitting and receiving, and MAC hardware coupled to the transceiver and modem, the MAC hardware including a local synchronization clock, each network identifier identifying a wireless network for which the wireless device acts as an access point:
    determining a time offset to use with the local synchronization clock for the time for transmitting a frame that includes a broadcast-buffered indication indicating that there is broadcast or multicast traffic buffered in the particular access point of the network identifier in between other frames broadcast by the access point of the network identifier not containing broadcast-buffered indications, the indications being to indicate to particular clients of the particular access point that data is buffered for that client in the access point, the determining using the number of network identifiers active on the device, a provided time period that indicates the time between transmissions of frames that includes a broadcast-buffered indication, and a provided time period that indicates the time between transmissions of the other frames by the access point of the network identifier,
    such that the frames containing the broadcast-buffered indication for the plurality of access points of the wireless device are transmitted by the wireless device at times spread substantially evenly between successive broadcast-buffered indication-containing frames for any one of the plurality of network identifiers, interleaved with other frames not containing broadcast-buffered indications.

10. A computer-readable medium as recited in claim 9, wherein the determining is configured such that it is relatively unlikely that two frames containing a broadcast-buffered indication are transmitted in succession by the wireless device to ensure that the wireless device has sufficient time to broadcast/multicast data buffered immediately after a broadcast-buffered indication-containing frame is transmitted.

11. A computer-readable medium as recited in claim 9, wherein the provided time period that indicates the time between transmissions of frames that includes a broadcast-buffered indication is the same for all the BSSIDs supported by the wireless device, and wherein the provided time period that indicates the time between transmissions of the other frames is the same for all the BSSIDs supported by the wireless device.

12. A computer-readable medium as recited in claim 9, wherein the access points of the wireless device substantially conform to the IEEE 802.11 standard, wherein the plurality of network identifiers is a plurality of BSSIDs, wherein for a particular BSSID and the device acting as a particular virtual AP for the particular BSSID, the frame that includes a broadcast-buffered indication is a beacon frame that includes a DTIM, and the other frame broadcast by the particular virtual AP of the particular BSSID is a beacon frame that includes a TIM but not a DTIM, wherein the provided time period that indicates the time between transmissions of frames that includes a broadcast-buffered indication is the DTIM period, and wherein the provided time period that indicates the time between transmissions of the other frames is the beacon period for the virtual APs supported by the wireless device.

13. A computer-readable medium as recited in claim 9, wherein the wireless device is coupled to a network device that includes a processor, and wherein the determining of the time offset is by the processor of the network device, the method further comprising:
    accepting at the wireless device the determined time offsets for each BSSID supported by the wireless device,
    such that the wireless device's transceiver transmits the frames containing the broadcast buffered indication according to the determined time offsets and the local synchronization clock, and
    such that the wireless device's transceiver also transmits the other frames.

14. A computer-readable medium as recited in claim 13, wherein the network device includes a switch.

15. A computer-readable medium as recited in claim 9, wherein the determining of the time offset is at wireless device,
    such that the wireless device's transceiver transmits the frames containing the broadcast buffered indication according to the determined time offsets and the local synchronization clock, and
    such that the wireless device's transceiver also transmits the other frames.

16. A computer-readable medium as recited in claim 12, wherein the DTIM period is the same for all the BSSIDs supported by the wireless device, wherein the beacon period is the same for all the BSSIDs supported by the wireless device, and wherein for a number, denoted Num_BSSID, of BSSIDs enabled on the wireless device, the determining includes:
  (a) if the DTIM period is less than Num_BSSID, setting a number p1 as Num_BSSID,
    else if the DTIM period equals Num_BSSID, setting p1 as the DTIM period, except,
      if the DTIM period>2, setting p_1 as the DTIM period−1, or
      if the DTIM period>6, setting p_1=the DTIM period−2, or
      if the DTIM period>7, p_1=the DTIM period−3,
    else, if the DTIM period is greater than Num_BSSID setting p_1 as the DTIM period;
  (b) setting a value phase_multiplier as the DTIM period divided by the Num_BSSID unless DTIM period is less than Num_BSSID, in which case setting phase_multiplier to 1, and
  (c) for each BSSID i enabled in the wireless device,
    if the DTIM period is the same as Num_BSSID, or if the DTIM period is Num_BSSID−1, denoting the interbeacon period equal to the beacon period devided by Num_BSSID as delta_b, setting the TSF offset for BSSID i as (delta_b * i)+((the DTIM period−i) * (the beacon period*phase_multiplier)), else, if the DTIM period is 1, setting the TSF offset for BSSID i as i * delta_b,
    else, in all other cases, setting the TSF offset for BSSID i as ((i mod p_1)* delta_b)+(i * phase_multiplier * the beacon period)

with * denoting multiplication.

17. An apparatus comprising
  means for determining a time offset to use with a local synchronization clock, the local synchronization clock included in a wireless device that supports a plurality of network identifiers, each network identifier identifying a wireless network for which the wireless device acts as an access point, the wireless device including means for wirelessly transmitting and receiving, and means for carrying out MAC processing, the MAC processing means including the local synchronization clock, the time offset being for calculating the time of transmitting, for each of the plurality of network identifiers active in the wireless device, a frame that includes a broadcast-buffered indication indicating that there is broadcast or multicast traffic buffered in the particular access point of the network identifier in between other frames broadcast by the access point of the network identifier not containing broadcast buffered indications to particular clients of the particular access point, the indications being to indicate that data is buffered for that client in the access point, the determining using the number of network identifiers active on the device, a provided time period that indicates the time between transmissions of frames that includes a broadcast-buffered indication, and a provided time period that indicates the time between transmissions of the other frames by the access point of the network identifier,
  such that the frames containing the broadcast buffered indication for each access point of the wireless device are transmitted by the wireless device at times spread substantially evenly, interleaved with other frames not containing broadcast buffered indications.

18. An apparatus as recited in claim 17, wherein the means for determining is configured such that it is relatively unlikely that two frames containing a broadcast-buffered indication are transmitted in succession by the wireless device to ensure that the wireless device has sufficient time to broadcast/multicast data buffered immediately after a broadcast-buffered indication-containing frame is transmitted.

19. An apparatus as recited in claim 17, wherein the provided time period that indicates the time between transmissions of frames that includes a broadcast-buffered indication is the same for all the BSSIDs supported by the wireless device, and wherein the provided time period that indicates the time between transmissions of the other frames is the same for all the BSSIDs supported by the wireless device.

20. An apparatus as recited in claim 17, wherein the access points of the wireless device substantially conform to the IEEE 802.11 standard, wherein the plurality of network identifiers is a plurality of BSSIDs, wherein for a particular BSSID and the device acting as a particular virtual AP for the particular BSSID, the frame that includes a broadcast-buffered indication is a beacon frame that includes a DTIM, and the other frame broadcast by the particular virtual AP of the particular BSSID is a beacon frame that includes a TIM but not a DTIM, wherein the provided time period that indicates the time between transmissions of frames that includes a broadcast-buffered indication is the DTIM period, and wherein the provided time period that indicates the time between transmissions of the other frames is the beacon period for the virtual APs supported by the wireless device.

21. An apparatus as recited in claim 17, wherein the wireless device is coupled to a network device that includes a processor, and wherein the means for determining of the time offset is by the processor of the network device, the apparatus further comprising:
  means for accepting at the wireless device the determined time offsets for each BSSID supported by the wireless device,
  such that the wireless device's means for transmitting transmits the frames containing the broadcast buffered indication according to the determined time offsets and the local synchronization clock, and
  such that the wireless device's means for transmitting also transmits the other frames.

22. An apparatus as recited in claim 21, wherein the network device includes a switch.

23. An apparatus as recited in claim 17, wherein the determining of the time offset is at wireless device,
  such that the wireless device's means for transmitting transmits the frames containing the broadcast buffered indication according to the determined time offsets and the local synchronization clock, and
  such that the wireless device's means for transmitting also transmits the other frames.

24. An apparatus containing a processor programmed to carry out a method, the method comprising:
  for each network identifier of a plurality of network identifiers active in a wireless device that supports the plurality of network identifiers, the wireless device including a transceiver and modem for transmitting and receiving, and MAC hardware coupled to the transceiver and modem, the MAC hardware including a local synchronization clock, each network identifier identifying a wireless network for which the wireless device acts as an access point:

determining a time offset to use with the local synchronization clock for the time for transmitting a frame that includes a broadcast-buffered indication indicating that there is broadcast or multicast traffic buffered in the particular access point of the network identifier in between other frames broadcast by the access point of the network identifier not containing broadcast buffered indications, the indications being to indicate to particular clients of the particular access point that data is buffered for that client in the access point, the determining using the number of network identifiers active on the device, a provided time period that indicates the time between transmissions of frames that includes a broadcast-buffered indication, and a provided time period that indicates the time between transmissions of the other frames by the access point of the network identifier, such that the frames containing the broadcast-buffered indication for the plurality of access points of the wireless device are transmitted by the wireless device at times spread substantially evenly between successive broadcast-buffered indication-containing frames for any one of the plurality of network identifiers, interleaved with other frames not containing broadcast buffered indications.

25. The apparatus as recited in claim 24, wherein the determining is configured such that it is relatively unlikely that two frames containing a broadcast-buffered indication are transmitted in succession by the wireless device to ensure that the wireless device has sufficient time to broadcast/multicast data buffered immediately after a broadcast-buffered indication-containing frame is transmitted.

26. The apparatus as recited in claim 24, wherein the provided time period that indicates the time between transmissions of frames that includes a broadcast-buffered indication is the same for all the BSSIDs supported by the wireless device, and wherein the provided time period that indicates the time between transmissions of the other frames is the same for all the BSSIDs supported by the wireless device.

27. The apparatus as recited in claim 24, wherein the access points of the wireless device substantially conform to the IEEE 802.11 standard, wherein the plurality of network identifiers is a plurality of BSSIDs, wherein for a particular BSSID and the device acting as a particular virtual AP for the particular BSSID, the frame that includes a broadcast-buffered indication is a beacon frame that includes a DTIM, and the other frame broadcast by the particular virtual AP of the particular BSSID is a beacon frame that includes a TIM but not a DTIM, wherein the provided time period that indicates the time between transmissions of frames that includes a broadcast-buffered indication is the DTIM period, and wherein the provided time period that indicates the time between transmissions of the other frames is the beacon period for the virtual APs supported by the wireless device.

28. The apparatus as recited in claim 24, wherein the wireless device is coupled to a network device, wherein the processor is part of the switch such that the determining of the time offset is by the processor of the network device, the method further comprising:

sending to the wireless device the determined time offsets for each BSSID supported by the wireless device, such that the wireless device's transceiver transmits the frames containing the broadcast buffered indication according to the determined time offsets and the local synchronization clock, and such that the wireless device's transceiver also transmits the other frames.

29. An apparatus as recited in claim 28, wherein the network device includes a switch.

30. An apparatus as recited in claim 24, wherein the processor is part of the wireless device, such that the determining of the time offset is at the wireless device, such that the wireless device's transceiver transmits the frames containing the broadcast buffered indication according to the determined time offsets and the local synchronization clock, and such that the wireless device's transceiver also transmits the other frames.

* * * * *

UNITED STATES PATENT AND TRADEMARK OFFICE
CERTIFICATE OF CORRECTION

| | | |
|---|---|---|
| PATENT NO. | : 7,379,435 B1 | |
| APPLICATION NO. | : 11/116543 | |
| DATED | : May 27, 2008 | |
| INVENTOR(S) | : Kinder | |

It is certified that error appears in the above-identified patent and that said Letters Patent is hereby corrected as shown below:

In column 5, lines 50-54, kindly change "Those parts of the MAC processing that are based in the wireless device, including aspects of the present invention, are controlled by code 223 that is loaded into the wireless device's host memory 221." to --FIG. 4 shows in simplified block diagram form one embodiment of a software architecture for the wireless device shown in FIG. 2 that includes an implementation of one or more aspects of the present invention.--

In column 9, line 11, kindly change "Num_ESSID" to --Num_BSSID--

Signed and Sealed this

Nineteenth Day of August, 2008

JON W. DUDAS
*Director of the United States Patent and Trademark Office*